US011081778B2

(12) United States Patent
Rizzo et al.

(10) Patent No.: US 11,081,778 B2
(45) Date of Patent: Aug. 3, 2021

(54) NEAR-FIELD COMMUNICATIONS LOW-POWER PRESENCE CHECK

(71) Applicant: STMicroelectronics, Inc., Coppell, TX (US)

(72) Inventors: Pierre Rizzo, Mountain View, CA (US); Christophe Henri Ricard, Santa Clara, CA (US)

(73) Assignee: STMicroelectronics, Inc., Coppell, TX (US)

( * ) Notice: Subject to any disclaimer, the term of this patent is extended or adjusted under 35 U.S.C. 154(b) by 286 days.

(21) Appl. No.: 16/123,908

(22) Filed: Sep. 6, 2018

(65) Prior Publication Data

US 2019/0097303 A1 Mar. 28, 2019

Related U.S. Application Data

(60) Provisional application No. 62/563,508, filed on Sep. 26, 2017, provisional application No. 62/653,121, filed on Apr. 5, 2018.

(51) Int. Cl.
*G01R 29/10* (2006.01)
*H01Q 1/22* (2006.01)
(Continued)

(52) U.S. Cl.
CPC .............. *H01Q 1/2216* (2013.01); *G01V 3/10* (2013.01); *H04B 5/0031* (2013.01); *H04B 5/0056* (2013.01)

(58) Field of Classification Search
None
See application file for complete search history.

(56) References Cited

U.S. PATENT DOCUMENTS

2017/0085457 A1 3/2017 Huang
2017/0098149 A1* 4/2017 Kesler ..................... H02J 50/80
(Continued)

FOREIGN PATENT DOCUMENTS

CN 104584448 A 4/2015
CN 105324905 A 2/2016
CN 105379055 A 3/2016

OTHER PUBLICATIONS

International Standard, "Identification cards—Contactless integrated circuit cards—Proximity cards—Part 3: Initialization and anticollision," ISO/IEC 14443-3, Third Edition, Sep. 1, 2016, 70 pages.

(Continued)

*Primary Examiner* — Trinh V Dinh
(74) *Attorney, Agent, or Firm* — Seed IP Law Group LLP

(57) ABSTRACT

A method and apparatus for performing a low-power presence check are provided. In the method and apparatus, a controller detects a presence of a tag by at least causing the antenna to generate a magnetic field over a first time period for detecting the tag, measuring an antenna voltage over a second time period, causing the antenna to cease generating a magnetic field over a third time period longer than the first time period and comparing the antenna voltage to an antenna reference voltage to determine whether the tag is present. The controller detects the presence of the tag in response to receiving a command from a host device for performing the low-power presence check. The command may be a one-time command for every presence check stage or a command that is repeatedly received each time the controller detects the presence of the tag.

20 Claims, 7 Drawing Sheets

(51) Int. Cl.
*G01V 3/10* (2006.01)
*H04B 5/00* (2006.01)

(56) References Cited

U.S. PATENT DOCUMENTS

2018/0041253 A1* 2/2018 Moonen .................. H02J 50/12
2021/0019482 A1* 1/2021 Shakedd ............ G06K 7/10366

OTHER PUBLICATIONS

ISO/IEC JTC 1 SC 17/WG 8, "Integrated circuit cards without contacts," ISO/IEC JTC 1/SC 17/WG8 N 2150, project editor Reinhard Meindl Sep. 25, 2013, 9 pages.

ISO/IEC JTC 1 SC 6, "Information technology—Telecommunications and information exchange between systems—Near Filed Communication—Interface and Protocol (NFCIP-1)," ISO/IEC WD 18092, Apr. 2011, 50 pages.

ISO/IEC JTC 1/SC 17, "Text for PDAM ballot or comment: ISO/IEC PDAM 1-14443-2.3—Identification cards—Contactless integrated circuit cards—Proximity cards—Part 2: Radio frequency power and signal interface—Amendment 1 Parameters supporting active and passive PICC transmissions," SC17/WG8, May 2015, 9 pages.

ST Technical Note, "ST25 NFC guide," TN1216, Oct. 2016, 38 pages.

NFC Controller Interface (NCI), Technical Specification, Version 2.0, NFC Forum™, Apr. 19, 2017, 208 pages.

* cited by examiner

NEAR-FIELD COMMUNICATIONS LOW-POWER PRESENCE CHECK

BACKGROUND

Technical Field

This application is directed to a near-field communications (NFC) controller, and in particular performing a low-power presence check by the NFC controller in active reader mode or poll mode.

Description of the Related Art

The International Organization for Standardization (ISO) and the International Electrotechnical Commission (IEC) 14443 standard (Identification cards—Contactless integrated circuit cards—Proximity cards) defines proximity cards used for identification and the transmission protocols for communicating with the cards. Conventional approaches to detecting the presence of a radiofrequency identification (RFID) tag in Active Reader Mode in power-inefficient. It is desirable to detect the presence of an RFID tag in Active Reader Mode in a power-efficient manner.

BRIEF SUMMARY

A method and an NFC controller for performing a low power presence check are provided. The method and controller perform low power presence check on an NFC tag, which may be an employee badge, a debit or a credit card, a loyalty program card, a key fob or a smartphone, among others. The controller is connected to an antenna. The low power presence check detects the presence of the NFC tag in a proximity or vicinity of the antenna in a power efficient manner. The controller controls the transmission of an electromagnetic field to detect the tag in a power efficient manner. The electromagnetic field in the low power presence check is intermittently transmitted to conserve power.

When the NFC tag is in a proximity of the antenna, the voltage output of the antenna is different than in the case where the NFC tag is away from (or removed from) the antenna. The controller measures an antenna reference voltage when the tag is in a proximity of the antenna. The controller then determines whether the tag has been removed during the low power presence check based on the antenna reference voltage. The controller intermittently (for example, four times per second) measures the antenna voltage during the low power presence check. The controller compares the measured antenna voltage to the antenna reference voltage. If the measured antenna voltage corresponds to the antenna reference voltage, the controller determines that the NFC tag has not been removed and is still in a proximity of the antenna. The measured antenna voltage may correspond to the antenna reference voltage when the measured antenna voltage is in a range within the antenna reference voltage. The range may be 100 millivolts (mV) above or below the antenna reference voltage.

If the measured antenna voltage does not correspond to the antenna reference voltage, the controller determines that the NFC tag has been removed and is not in a proximity of the antenna. That may occur when the measured antenna voltage is outside of the range. The controller may send a message to a host device indicating that the tag has been removed. The low power presence check may end in response to determining that the tag has been removed.

In an embodiment, a system includes an antenna, an antenna matching element coupled to the antenna and a controller coupled to the antenna matching element. The controller is configured to detect presence of a tag by at least: causing the antenna to generate a magnetic field over a first time period for detecting the tag, measuring an antenna voltage over a second time period, causing the antenna to cease generating a magnetic field over a third time period longer than the first time period and comparing the antenna voltage to an antenna reference voltage to determine whether the tag is present.

In an embodiment, the antenna voltage and the antenna reference voltage are peak-to-peak antenna voltages. In an embodiment, the controller is configured to continuously detect the presence of the tag if the tag is determined to be present. In an embodiment, the first time period is 50 microseconds to 50 milliseconds and the third time period is 200 milliseconds.

DETAILED DESCRIPTION

Figure 1:
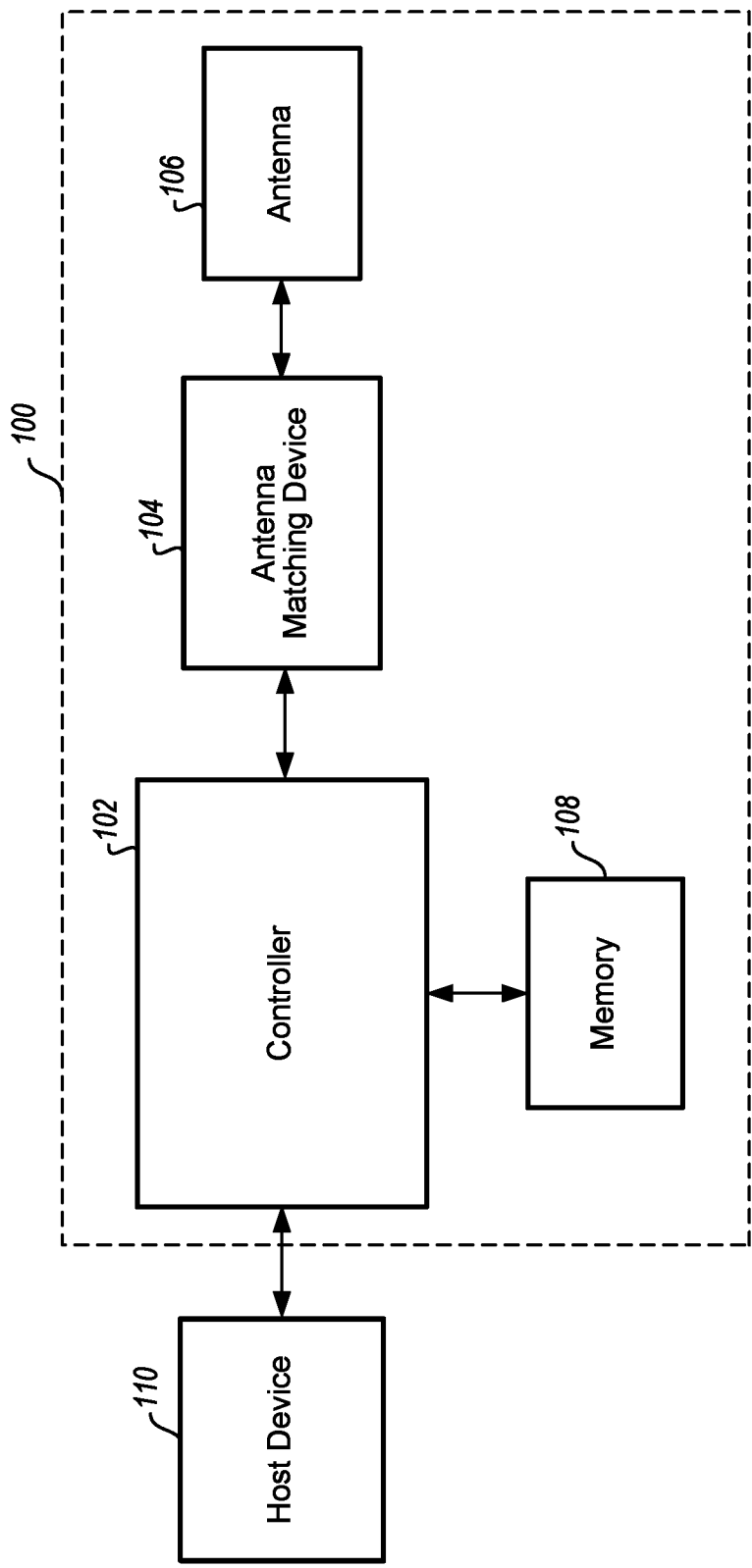
FIG. 1 shows an NFC system.

FIG. 1 shows an NFC system 100 coupled to a host device 110. The system 100 comprises an NFC controller 102, an antenna matching device 104, an antenna 106 and memory 108. The memory 108 may be any type of non-transitory computer readable storage media, such as, static or dynamic memory. The memory 108 may be configured to store executable instructions, that when executed by the controller 102, cause the controller to operate as described herein. The memory 108 may store a firmware that is accessible by the controller 102. The firmware may dictate operation of the controller 102 as described herein. The controller 102 may be a microcontroller, a processor or a microprocessor, among others. The controller 102 may also include analog-to-digital conversion (ADC) circuitry (not shown). The controller 102 operates the NFC system 100.

The controller 102 may access the firmware in the memory 108. Based on the firmware, the controller 102 may send an instruction to the antenna matching device 104 to activate or power the antenna 106. The antenna matching device 104 may be an antenna driver among others. In response to sending the instruction, the antenna matching device 104 causes the antenna 106 to generate (or irradiate) a magnetic field. The magnetic field induces a passive device, such as a radio-frequency identification (RFID) device (generally referred to as an RFID tag) to transmit a response signal. The tag may be in a proximity of the antenna 106. The magnetic field solicits a response from the tag (not shown). The tag transmits the response, which is detected by the antenna 106. The response is detected by the antenna 106. The antenna 106 outputs a voltage representative of the response to the antenna matching device 104. The antenna matching device 104 may scale the voltage, for example, using a voltage divider circuit. The antenna matching device 104 outputs the voltage that is scaled and/or otherwise processed to the controller 102. The controller 102 may send data representative of the response to the host device 110.

The host device 110 may be any type of processor configured to control the NFC controller 102 of the NFC system 100. The host device 110 may be a processor, microcontroller or microprocessor, among others. For example, if the NFC system 100 is used in a tablet, laptop or smartphone, the host device 110 may be a processor of the tablet, laptop or smartphone, respectively. The host device 110 may command the controller 102 to operate in various modes, for example, as defined by an NFC protocol, such as an NFC protocol set by the NFC Forum industry standardization body. The host device 110 may command the controller 102 to operate in a poll mode, card detection mode or presence check mode, among others. The host device 110 outputs a command to the controller 102. The command instructs the controller 102 to perform a presence check on the tag. The controller 102 receives the commands, performs the presence check and sends a result of the presence check to the host device 110.

Figure 2:
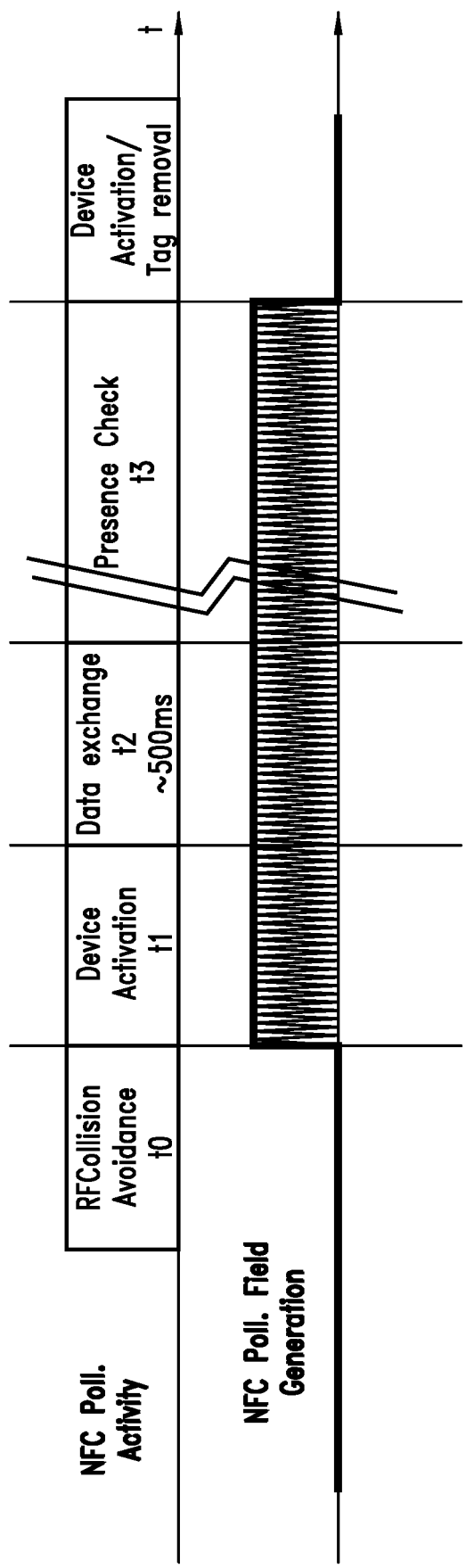
FIG. 2 shows stages of active reader mode.

FIG. 2 shows stages of active reader mode of an NFC device. Active reader mode may also be referred to as poll mode. Five stages are shown in FIG. 2. The first stage is referred to herein as the radiofrequency (RF) collision avoidance stage. The first stage has a first stage duration (t0). In the first stage, collision avoidance is ensured and it is determined whether there is another NFC reader antenna within a proximity of the antenna 106. If it is determined that there is not another NFC antenna in a proximity of the antenna 106 and radiofrequency (RF) interference or collision may be avoided, the second stage commences. The second stage is referred to herein as the device activation stage and has a second stage duration (t1). In the second stage, tags in a proximity of the antenna 106 are activated. Further, an inventory of the RFID devices is taken or the RFID devices are inventoried. For example, in the second stage a request may be sent to the tags in the proximity of the antenna 106. The requests may solicit responses from the tags. The responses received by the antenna 106 may sent to the controller 102. The controller 102 may parse the responses to identify the responsive tags. The controller 102 sends a reply to the host device 110 indicating the identified responsive tags.

Once the various tags are identified in the device activation stage, the controller 102 may selectively communicate with one of the tags. Communication between the controller 102 and the tag may be performed in a third stage (referred to herein as the data exchange stage). The third stage has a third stage duration (referred to herein as t2). In the data exchange stage, the controller 102 and the tag communicate over a channel and exchange data. The data exchange stage may have any duration. For example, the data exchange stage may last about half a second or 500 milliseconds (ms).

After the data exchange stage the controller 102 transitions to a fourth stage (referred to herein as the presence check stage). The fourth stage has a fourth stage duration (t3). The fourth stage duration may last an indefinite period of time. For example, the fourth stage may continue as long as the tag is in a proximity of the antenna 106 or is responsive to an antenna-induced field. During the fourth stage, the controller 102 may cause the antenna 106 to continuously generate a magnetic field and retain the tag in the activated stage. The controller 102 may do so in order to keep the tag activated for a potential communication. During the fourth stage, the controller 102 may receive responses from the tag. However, the controller 102 may not evaluate the received responses. To the contrary the controller 102 may only ensure that a response has been received but may not evaluate or parse the response. Thus, in the fourth stage, the controller 102 remains activated. Further the antenna matching element 104 and the antenna 106 are also continuously active. For example, the antenna 106 continuously generates a magnetic field.

The indefinite activation of the system 100 during the fourth stage is power consuming. For example if a user that is an employee leaver their employee badge having a tag on a reader overnight, the reader will continuously power the tag in the badge all night, using significant power to generate the magnetic field through the duration of the night. The NFC system 100 can potentially generate a dangerous amount of heat in the tag or reader during this presence check mode.

The antenna matching device 104 and antenna 106 dissipate heat due to their continuous operation. This results in heating the system 100, potentially to an unsafe level that could burn a user or damage the electrical components of the device. Further, the complexity of the system 100 is increased due to the fact that heatsinks and/or other user safety devices may be added to the system to cool down components.

As shown in FIG. 2, the system 100 may generate a magnetic field continuously between the commencement of the device activation stage to the end of the presence check stage. The presence check stage may last or persist indefinitely. Accordingly, the magnetic field may be generated by the system 100 for a relatively long period of time.

The present disclosure is directed to an NFC poll field generation sequence that reduces the power and reduces the time period during the presence check that the magnetic field is generated.

Figure 3:
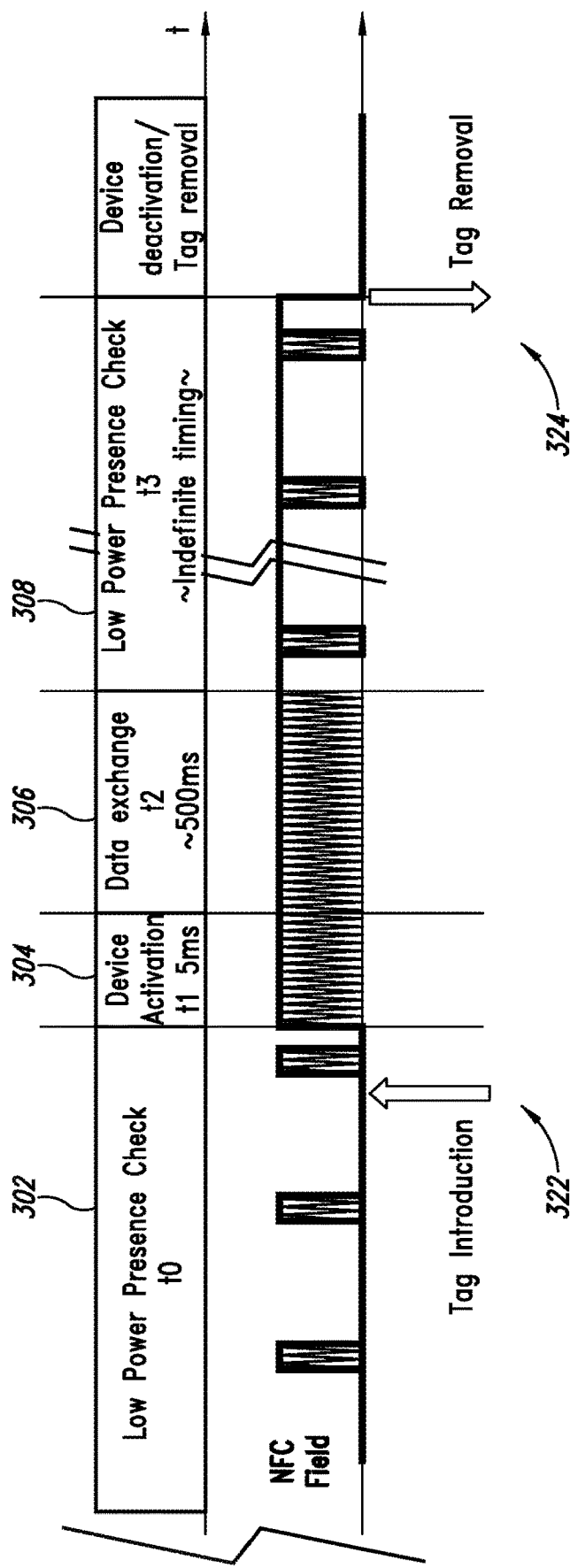
FIG. 3 shows stages of active reader mode of an NFC device according to the present disclosure.

FIG. 3 shows stages of active reader mode of an NFC device according to the present disclosure. Initially, the NFC system 100 is in a low power presence check stage 302. During the low power presence check stage 302, the controller 102 commands the antenna 106 to generate a field to detect whether an NFC tag (or card) is in a proximity of the antenna 106. The field may be generated at periodically or according to any time schedule. The field may be generated intermittently to achieve power saving. At a first time instance 322, a tag is introduced. The tag responds to the field generated during the low power presence check stage 302. In response to detecting the tag, the host device 110 transitions the controller 102 to the device activation and data exchange stages 304, 306 as described herein.

After the data exchange state 306 concludes, the controller 102 transitions to the low power presence check stage 308. The controller 102 may transition to the low power presence check stage 308 in response to a command from the host device 110. As described herein, the low power presence check stage 308 concludes in response removal of the tag at a second time instance 324.

Figure 4:
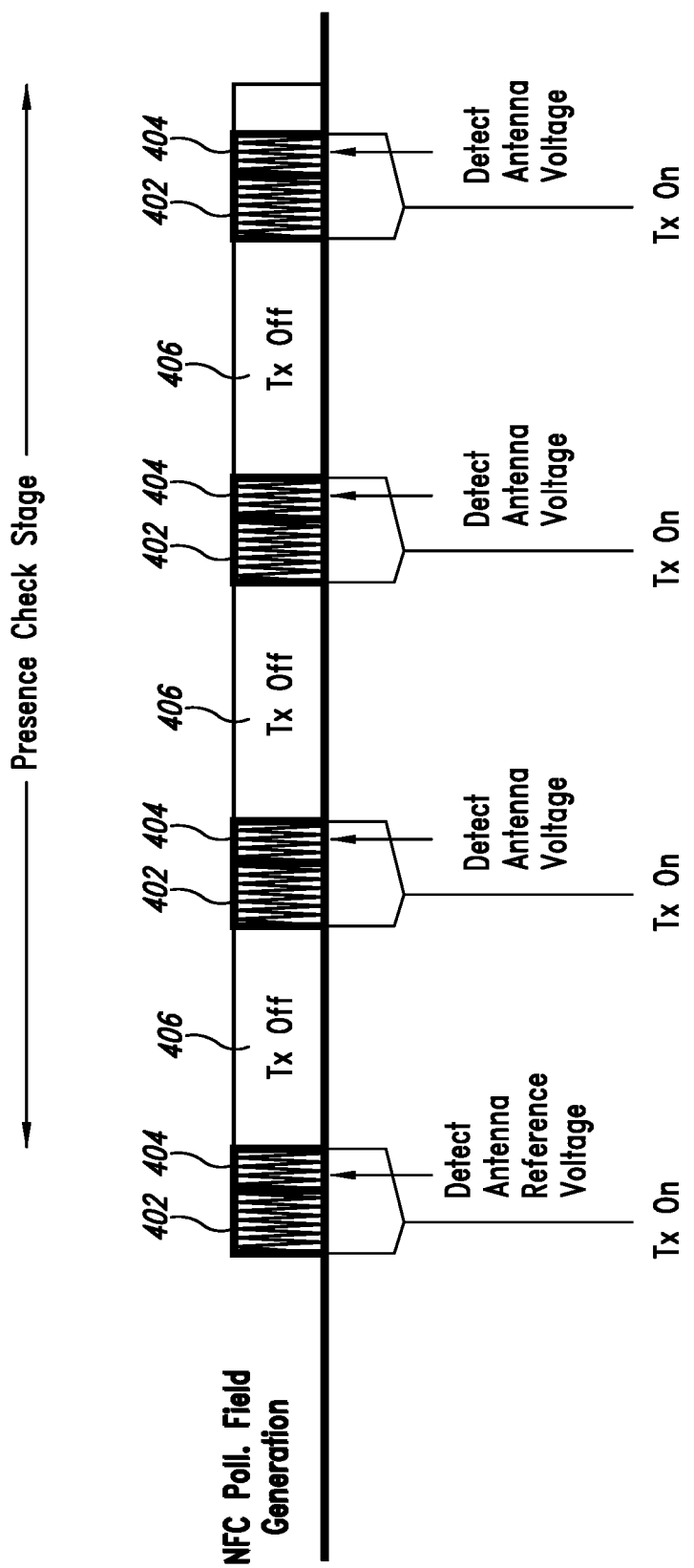
FIG. 4 shows a timing diagram of the operation of the controller in the presence check stage.

FIG. 4 shows a timing diagram of the operation of the controller 102 in the low power presence check stage 306. Whereas the controller, per the operation described with reference to FIG. 2, is continuously operated and generates or powers the magnetic field, in operation of FIGS. 3 and 4, the controller 102 reduces the time period during which the magnetic field is generated, such that the magnetic field may be turned off periodically to limit certain functionality of the controller 102 and save power. In a first time period 402, the antenna 106 is still generating the magnetic field from the data exchange in the previous portion of the poll mode.

The first instance of the first time period 402 (shown in FIG. 4 for antenna voltage reference measurement and $V_{loadtag}(t0)$ setting) may include a presence check burst that includes a communication from the reader to the tag. Then, the antenna reference voltage measurement is made and $V_{loadtag}(t0)$ is set. Subsequent bursts are shorter and do not include a communication. Subsequent bursts may be as small burst as necessary to make an antenna voltage measurement ($V_{loadtag}(t0+n)$) for comparison with the antenna reference voltage measurement ($V_{loadtag}(t0)$).

Once the data transfer is complete, the controller detects, in a second time period 404, a voltage on the antenna 106 representative of the voltage associated with the presence of a specific, recently communicated with tag. This voltage is a reference voltage for the remainder of the presence check period associated with this specific tag. The second time period 404 is a sub-period of the first time period 402. The antenna voltage measurement is made when antenna voltage is established and is stable just before switching off the field of the first time period 402. The measurement is made when the reader is still generating power. The second time period 404 is a subset of and part of the first time period 402.

After the reference voltage is detected, the antenna is turned off in a third time period 406 and does not generate a magnetic field. The third time period 406 may be relatively lengthy. For example, the third time period 406 may be 200-250 ms. After the third time period 406 expires, the controller 102 commands the antenna 106 to generate the magnetic field again for a presence check to determine if the same tag is still within the proximity of the antenna 106. The antenna 106 may generate the magnetic field for a duration of the first time period 402. Towards the end of the time period during which the magnetic field is on, the controller detects the voltage on the antenna and compares this voltage with the reference voltage. When the first or second time periods 402, 404 expire after the voltage on the antenna is detected, the antenna 106 ceases generating the magnetic field. Generation of the field charges a tag in the proximity of the antenna 106, which affects the voltage detectable on the antenna on the reader. The position of the tag and the type of tag itself affects the voltage on the antenna. The first time period 402 is shorter than the third time period 406. For example, whereas the third time period 406 may be 200-250 ms, the first time period 402 may be from 50 microseconds (μs) to 50 ms. The time the antenna is generating the magnetic field is minimized to reduce power consumption and heat build-up during this presence check mode. The antenna 106 may thus repeat the on-off cycle four times per second.

When the tag is away from the antenna 106, a relatively high voltage is output by the antenna 106. Conversely, when the tag is within a proximity of or is close to the antenna 106, a relatively low voltage is output by the antenna 106. The controller can determine by comparing the reference voltage right after a data transfer to the detected voltage during each presence check cycle to determine whether the tag is the same, in the same place, or if a different tag has been introduced. If the voltage is different or significantly different from the reference voltage, then the controller can restart the poll mode or activate the Device activation/tag removal portion of the sequence of FIG. 3. For example, if a difference between the reference voltage and the detected voltage is greater than a threshold amount, the controller will move to the device activation/tag removal phase of the poll mode. The threshold amount may, for example, be 100 millivolts (mV).

During the second time period 404, (the measurement period at the end of the first time period 402) the controller 102 or internal devices of the system 100, such as, an ADC converter and a comparator, among others, detects the antenna voltage. The antenna voltage may be a peak-to-peak (P2P) voltage measured at an output of the antenna 106. The detected voltage is deemed an antenna reference voltage. The antenna reference voltage is stored for comparison with subsequently detected antenna voltages. The antenna reference voltage is representative of the voltage output by the antenna as the tag responds to an applied magnetic field. The proximity of the tag causes a voltage having a voltage level of the antenna reference voltage to be detectable at the antenna 106. The second time period 404 may be much shorter than the third time period 406.

The antenna reference voltage is detected when the tag is in the proximity of the antenna 106. Following detection of the antenna reference voltage, subsequent antenna voltages are detected intermittently to determine whether the tag is or remains in a proximity of the antenna 106. The first and second time periods 402, 404 may both include magnetic field generation. Or the magnetic field may be generated in the first time period 402 and turned on during voltage detection in the second time period 404.

As shown in FIG. 4, after the antenna reference voltage is detected, the antenna 106 ceases generating the magnetic field for a duration of the third time period 406. Then, the antenna 106 generates a magnetic field over the duration of the first and second time periods 402, 404. The antenna voltage is detected over the second time period 404. The antenna voltage is compared with antenna reference voltage. If the antenna voltage corresponds to the antenna reference voltage, the tag is determined to be in a proximity of the antenna 106. Conversely, if the antenna voltage does not correspond to the antenna reference voltage, the tag is determined to have been removed or to have ceased being in a proximity of the antenna 106. As described herein, correspondence between the antenna voltage and the antenna reference voltage may be found when the antenna voltage is within a range of antenna reference voltage, which may be 100 mV. As described herein, the antenna voltage and the antenna reference voltage may be peak-to-peak voltages.

If the tag is determined to be in a proximity of the antenna 106, the controller 102 continues the procedure described herein. The controller 102 turns off the antenna 106 for the duration of the third time period 406, turns on the antenna 106 for the first and second time periods 402, 404 and detects the antenna voltage over the second time period 404.

Conversely, if the tag is determined to have been removed or is no longer in the proximity of the antenna 106, the presence check stage ends. Subsequently, the RF collision avoidance stage may commence at a later time.

The controller 102 operates the NFC system 100 in the presence check stage in response to receiving a command from the host device 110. The host device 110 may send the command to trigger the controller 102 to commence the presence check stage. In an embodiment, the host device 110 may be aware that the controller performs the low power presence check stage 308 described with reference to FIGS. 3 and 4 herein. The host device 110 may send a command, which may be a proprietary NFC controller interface (NCI) command, to instruct the controller 102 to begin the low power presence check stage 308. The command may be sent one-time to cause the controller 102 to initiate or start the low power presence check stage 308. After the command is sent, the controller 102 repeatedly turns on and off the magnetic field to detect whether the tag is present or has been removed.

Alternatively, the command may not be a one-time command. Instead the host device 110 may repeatedly send the command to the NFC controller 102. Each time the controller 102 receives the command, the controller 102 performs one on-off cycle described with reference to numerals 402, 404, 406 of FIG. 4. The controller 102 may await the receipt of the command to perform the on-off cycle.

In an embodiment, the host device 110 may not be aware that the controller 102 performs a low power presence check or the host device may not use a proprietary command for initiating low power presence check stage (or for continuing low power presence check operations). The host device 110 may send a legacy command (or data pattern). The NFC protocol or software or firmware stack of the host device 110 may not be changed for the host device 110 to send the legacy command. Low power presence check operations may be implemented by the controller 102 to replace conventional presence check operations described with reference to FIG. 2. However, the NFC protocol or software or firmware stack of the host device 110 may be sought to remain unchanged. In this case, the host device 110 may send the legacy command (or data pattern) to the controller 102.

In response to receiving the legacy command, the controller performs a low power presence check rather than the conventional presence check. The controller 102 then sends the results of the low power presence check to the host device 110. The controller 102 reports the results of the low power presence check as being the results of a conventional presence check. Thus, the controller 102 "fakes" performing the conventional presence check when it had performed a low power presence check. That is, the controller 102 "deceives" the host device 110 by appearing to have performed a conventional presence check as described with reference to FIG. 2 when it had performed a low power presence check. However, by using legacy command, the host device 110 protocol and firmware stack are unchanged. At the same time, the controller 102 operates more energy efficiently by performing a low power presence check in place of a conventional presence check.

Figure 5:
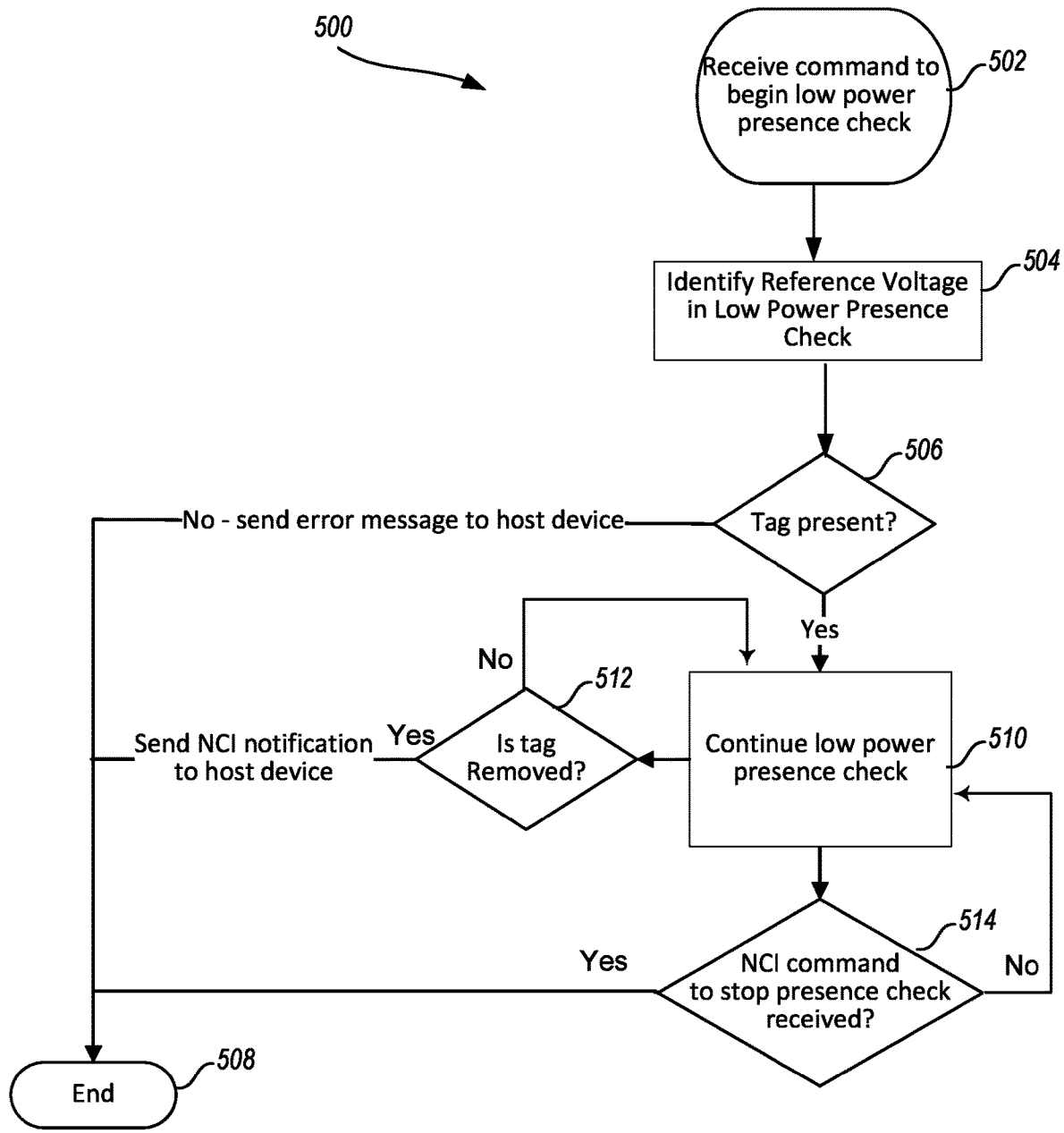
FIG. 5 shows a method for performing a low power presence check in accordance with an embodiment.

FIG. 5 shows a method 500 for performing a low power presence check in accordance with an embodiment. In the method 500, the host device sends a one time command, which may be a proprietary NCI command, to instruct the controller 102 to begin the low power presence check stage 308. At 502, the controller 102 receives the command to begin low power presence check. At 504, the controller 102 identifies the antenna reference voltage $V_{loadtag}(t0)$ in the low power presence check stage 308.

At 506, the controller 102 determines whether the tag is present by comparing the antenna reference voltage with the antenna voltage as described herein. If a negative determination is made, the controller 102 sends an error message to the host device 110 indicating the tag is not present. The low power presence check stage ends at 508. If a positive determination is made, the controller 102 continues low power presence check at 510.

While in the low power presence check stage, the controller 102 determines, at 512, whether the tag is removed and determines, at 514, whether an NCI command to stop presence check is received from the host device. If a positive determination is made at 512, the controller 102 sends an NCI notification to the host device 110 that the tag has been removed. Then, the low power presence check stage ends at 508. Detection of tag removal is performed based on comparing the antenna reference voltage with the antenna voltage as described herein. If a negative determination is made at 512, the process reverts to 510, where the low power presence check stage is continued.

If a positive determination is made at 514, the low power presence check stage ends at 508. Subsequently, the tag may be reactivated (for example, in response to a command from the host device 110). If a negative determination is made at 514, the process reverts to 510, where the low power presence check stage is continued.

Figure 6:
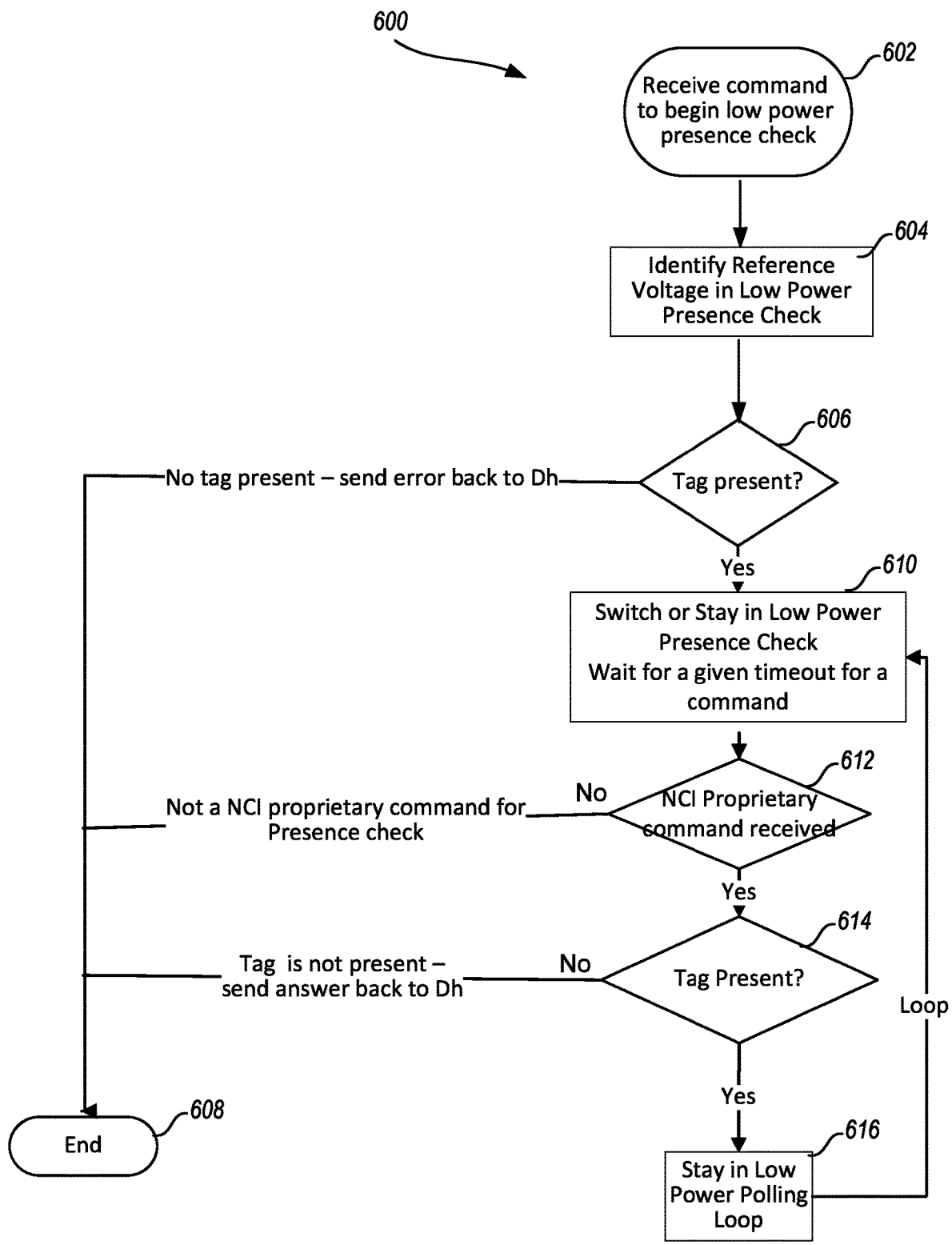
FIG. 6 shows a method for performing a low power presence check in accordance with an embodiment.

FIG. 6 shows a method 600 for performing a low power presence check in accordance with an embodiment. In the method 600, the host device 110 sends a command, each time a low power presence check is performed to determine whether the tag is present. In the method 600, the controller 102, at 602, receives a command to begin low power presence check from the host device 110. At 604, the controller 102 identifies the antenna reference voltage $V_{loadtag}(t0)$.

At 606, the controller 102 determines whether the tag is present by comparing the antenna reference voltage with the antenna voltage as described herein. If a negative determination is made, the controller 102 sends an error message to the host device 110 indicating the tag is not present. The low power presence check stage ends at 608. If a positive determination is made, the controller 102 continues low power presence check at 610. The controller 102 awaits receiving a command from the host device 110 for a duration of a timeout period.

At 612, the controller 102 determines whether an NCI command to continue operating in the low power presence check stage is received during the timeout period. If a negative determination is made, the controller 102 ends the low power presence check stage at 608. If a positive determination is made, the method proceeds to step 614. At 614, determines whether the tag is present. Determining whether the tag is present is performed based on comparing the antenna reference voltage with the antenna voltage as described herein.

If a negative determination is made at 614, the controller 102 sends an NCI notification to the host device 110 that the tag has been removed. Then, the low power presence check stage ends at 608. If a positive determination is made at 614, the controller 102 remains in the low power presence check stage at 616. The controller 102 reverts to waiting for a timeout period to receive a command to continue operating in the low power presence check stage.

Figure 7:
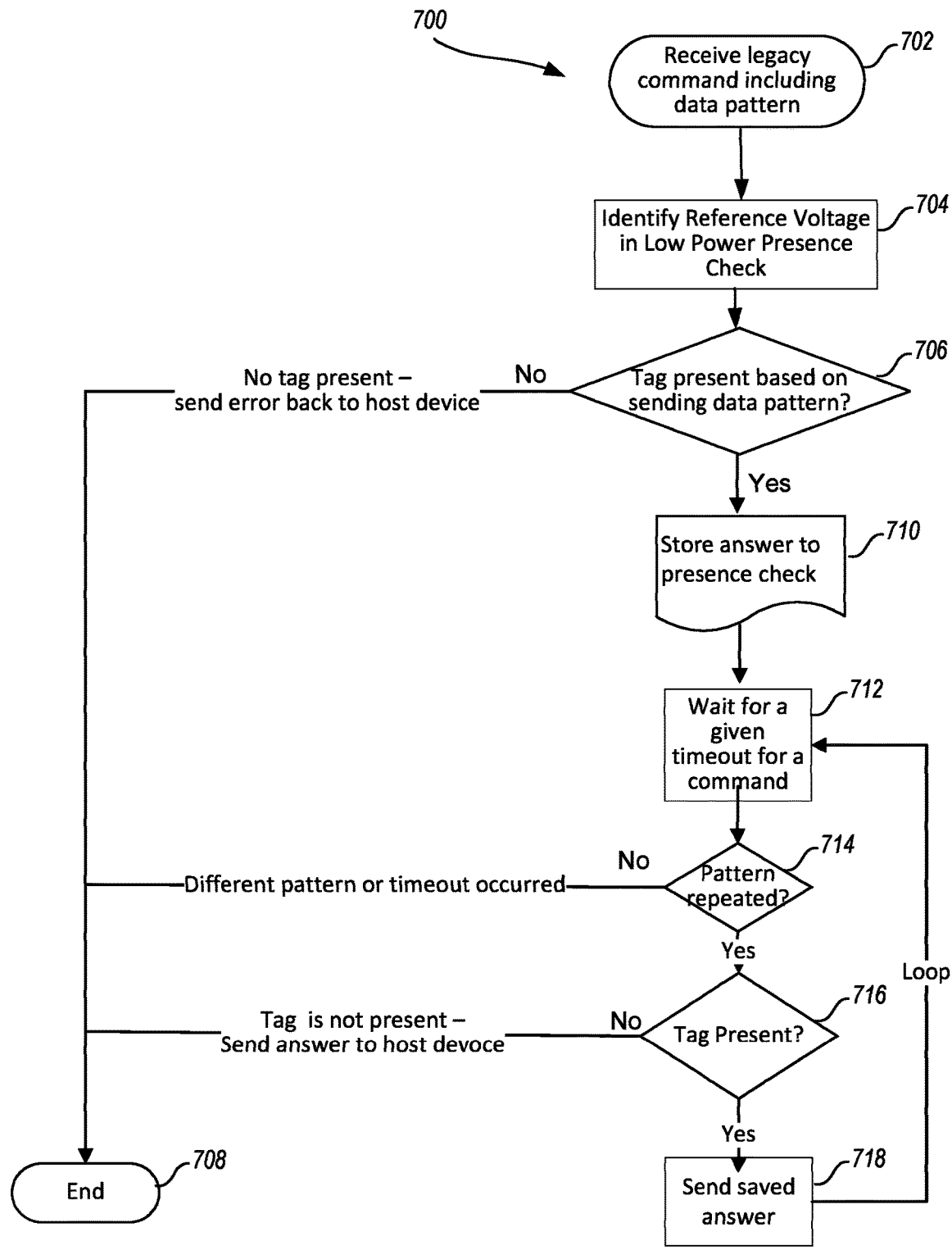
FIG. 7 shows a method for performing a low power presence check in accordance with an embodiment.

FIG. 7 shows a method 700 for performing a low power presence check in accordance with an embodiment. In the method 700, the host device 110 sends a legacy command, which may include a data pattern to be transmitted to the tag. The legacy command instructs the controller 102 to perform a presence check. In response to receiving the legacy command, the controller 102 performs a low power presence check to determine whether the tag is present. When the tag is present, the controller 102 sends a response to the host device 110. The response matches or corresponds to with a response that is expected to be received the host device 110 (e.g., from the tag in response to sending the data pattern).

In the method 700, the controller 102, at 702, receives a legacy command to begin presence check from the host device 110. At 704, the controller 102 identifies the antenna reference voltage $V_{loadtag}(t0)$. At 706, the controller 102 determines whether the tag present based on sending the data pattern to the tag. The controller 102 causes the data pattern in the legacy command to be transmitted to the tag. The controller 102 receives the response from the tag and determines based on the response whether the tag is present.

If the tag is determined to be not present, the controller 102 sends an error message to the host device 110 indicating the tag is not present. The presence check ends at 708. If the tag is determined to be present, the controller 102 at 710 stores the tag's answer to the presence check. It is noted that, thus far, a low power presence check has not been performed. Rather, the tag's answer to a conventional presence check is stored. The controller 102 may store the tag's answer in the memory 108.

At 712, the controller 102 waits for a timeout period to receive the legacy command including the data pattern again. At 714, the controller 102 determines whether the legacy command including the data pattern is received from the host device 110 before the timeout period expires. If a negative determination is made at 714, as a result of receiving a different pattern or receiving the same data pattern after timeout period expires, the presence check stage ends at 708.

If a positive determination is made at 714, the controller 102 at 716 determines whether the tag is present by comparing the antenna reference voltage with the antenna voltage in accordance with the low power presence check techniques described herein. If the controller 102 at 716 determines that the tag is not present, the controller 102 sends an NCI notification to the host device 110 that the tag has been removed. Then, the low power presence check stage ends at 608.

If the controller 102 at 716 determines that the tag is present, the controller 102, at 718, sends the stored tag answer to host device 110. Thus, the controller 102 can operate in low power presence check without modification to the host device. The host device 110 receives the tag's answer as it (or as it would expect) in a conventional presence check. Thus, the controller 102, from the host device's 110 perspective, "fakes" performing a conventional presence check while in fact performing a low power presence check to achieve power efficiency. The controller 102 then reverts to step 712 and awaits receiving another legacy command including a data pattern.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   an antenna;
   an antenna matching element coupled to the antenna;
   a controller, coupled to the antenna matching element, configured to detect presence of a tag by at least:
      causing the antenna to generate a magnetic field over a first time period for detecting the tag;
      measuring an antenna voltage over a second time period;
      causing the antenna to cease generating a magnetic field over a third time period longer than the first time period; and
      comparing the antenna voltage to an antenna reference voltage to determine whether the tag is present.

2. The system of claim 1, wherein the antenna voltage and the antenna reference voltage are peak-to-peak antenna voltages.

3. The system of claim 1, wherein the controller is configured to continuously detect the presence of the tag if the tag is determined to be present.

4. The system of claim 1, wherein the first time period is 50 microseconds to 50 milliseconds and the third time period is 200 to 250 milliseconds.

5. The system of claim 1, wherein the second time period is a subset of and included in the first time period.

6. The system of claim 1, wherein the controller causes causing the antenna to generate the magnetic field over the first time period and the second time period.

7. The system of claim 1, wherein the controller is configured to:
   receive a command from a host device instructing the controller to perform a low power presence check; and
   in response to receiving the command, detect the presence of the tag.

8. The system of claim 7, wherein the command is a one-time command to perform the low power presence check.

9. The system of claim 7, wherein the command repeatedly received every time the controller detects the presence of the tag.

10. A method, comprising:
    detecting a presence of a tag by at least:
       causing an antenna to generate a magnetic field over a first time period for detecting the tag;
       measuring an antenna voltage over a second time period;
       causing the antenna to cease generating a magnetic field over a third time period longer than the first time period; and
       comparing the antenna voltage to an antenna reference voltage to determine whether the tag is present.

11. The method of claim 10, wherein the antenna voltage and the antenna reference voltage are peak-to-peak antenna voltages.

12. The method of claim 10, comprising:
    continuously detecting the presence of the tag if the tag is determined to be present.

13. The method of claim 10, wherein the first time period is 50 microseconds to 50 milliseconds and the third time period is 200 to 250 milliseconds.

14. The method of claim 10, wherein the second time period is a subset of and included in the first time period.

15. The method of claim 10, comprising:
    receiving a command from a host device including an instruction to perform a low power presence check; and
    in response to receiving the command, detect the presence of the tag.

16. The method of claim 15, wherein the command is a one-time command to perform the low power presence check.

17. The method of claim 15, wherein the command repeatedly received every time the controller detects the presence of the tag.

18. A controller, comprising:
    an input coupled to an antenna matching element that is coupled to an antenna; and
    an output coupled to the antenna matching, wherein the controller is configured to:
    detect presence of a tag by at least:
       causing the antenna to generate a magnetic field over a first time period for detecting the tag;

measuring an antenna voltage over a second time period;

causing the antenna to cease generating a magnetic field over a third time period longer than the first time period; and comparing the antenna voltage to an antenna reference voltage to determine whether the tag is present.

19. The controller of claim 18, wherein the antenna voltage and the antenna reference voltage are peak-to-peak antenna voltages.

20. The controller of claim 18, wherein the controller is configured to continuously detect the presence of the tag if the tag is determined to be present.

* * * * *